(12) United States Patent
Kawaura et al.

(10) Patent No.: US 9,735,439 B2
(45) Date of Patent: Aug. 15, 2017

(54) FUEL CELL VEHICLE

(71) Applicant: HONDA MOTOR CO., LTD., Tokyo (JP)

(72) Inventors: Takashi Kawaura, Wako (JP); Akihiro Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 14/108,347

(22) Filed: Dec. 17, 2013

(65) Prior Publication Data

US 2014/0170530 A1    Jun. 19, 2014

(30) Foreign Application Priority Data

Dec. 19, 2012  (JP) ................. 2012-277338

(51) Int. Cl.
*H01M 8/04* (2016.01)
*H01M 8/04082* (2016.01)
(Continued)

(52) U.S. Cl.
CPC ..... *H01M 8/04201* (2013.01); *B60L 11/1883* (2013.01); *B60L 11/1896* (2013.01); *B60L 11/1898* (2013.01); *F17C 5/007* (2013.01); *F17C 5/06* (2013.01); *F17C 7/00* (2013.01); *F17C 2205/037* (2013.01); *F17C 2205/0364* (2013.01); *F17C 2221/012* (2013.01); *F17C 2223/0123* (2013.01);
(Continued)

(58) Field of Classification Search
CPC ................ H01M 2250/20; H01M 8/04201
USPC ...................................... 429/515
See application file for complete search history.

(56) References Cited

U.S. PATENT DOCUMENTS

2003/0081288 A1* 5/2003 Ishii .............. H04B 10/114
  398/135
2010/0065147 A1* 3/2010 Gerard et al. .............. 141/4
(Continued)

FOREIGN PATENT DOCUMENTS

JP      2010-255754    11/2010
JP      2010-260436    11/2010
WO      WO 2010/067444  6/2010

OTHER PUBLICATIONS

Japanese Office Action for corresponding JP Application No. 2012-277338, Oct. 15, 2014.

*Primary Examiner* — Patrick Ryan
*Assistant Examiner* — Victoria Lynch
(74) *Attorney, Agent, or Firm* — Mori & Ward, LLP

(57) ABSTRACT

A fuel cell vehicle includes a fuel cell, a storage device, a receptacle, a housing, and a vehicle side communication device. The housing has a bottom wall recessed from a surface of a body of the fuel cell vehicle by a predetermined depth. The receptacle protrudes from a bottom face of the bottom wall to an inner space of the housing. The vehicle side communication device is provided to the housing on an outer circumferential side of the receptacle. The vehicle side communication device is configured to wirelessly communicate with a nozzle side communication device provided to a nozzle. The vehicle side communication device is disposed on a deeper side than the bottom face of the bottom wall and/or is disposed via a partition wall configured to shield the vehicle side communication device from fuel gas in the inner space.

11 Claims, 9 Drawing Sheets

(51) Int. Cl.
*F17C 5/00* (2006.01)
*B60L 11/18* (2006.01)
*F17C 5/06* (2006.01)
*F17C 7/00* (2006.01)

(52) U.S. Cl.
CPC   *F17C 2223/036* (2013.01); *F17C 2225/0123* (2013.01); *F17C 2225/036* (2013.01); *F17C 2250/032* (2013.01); *F17C 2250/034* (2013.01); *F17C 2250/043* (2013.01); *F17C 2250/0439* (2013.01); *F17C 2250/0443* (2013.01); *F17C 2250/0473* (2013.01); *F17C 2250/0478* (2013.01); *F17C 2250/0491* (2013.01); *F17C 2250/0636* (2013.01); *F17C 2265/065* (2013.01); *F17C 2270/0139* (2013.01); *F17C 2270/0168* (2013.01); *H01M 2250/20* (2013.01); *Y02E 60/321* (2013.01); *Y02T 90/16* (2013.01); *Y02T 90/32* (2013.01); *Y02T 90/34* (2013.01)

(56) References Cited

U.S. PATENT DOCUMENTS

2011/0247726 A1* 10/2011 Okawachi ............... F17C 5/007
                                                                          141/82
2013/0199660 A1*  8/2013 Cun ................... B60L 11/1838
                                                                           141/1

\* cited by examiner

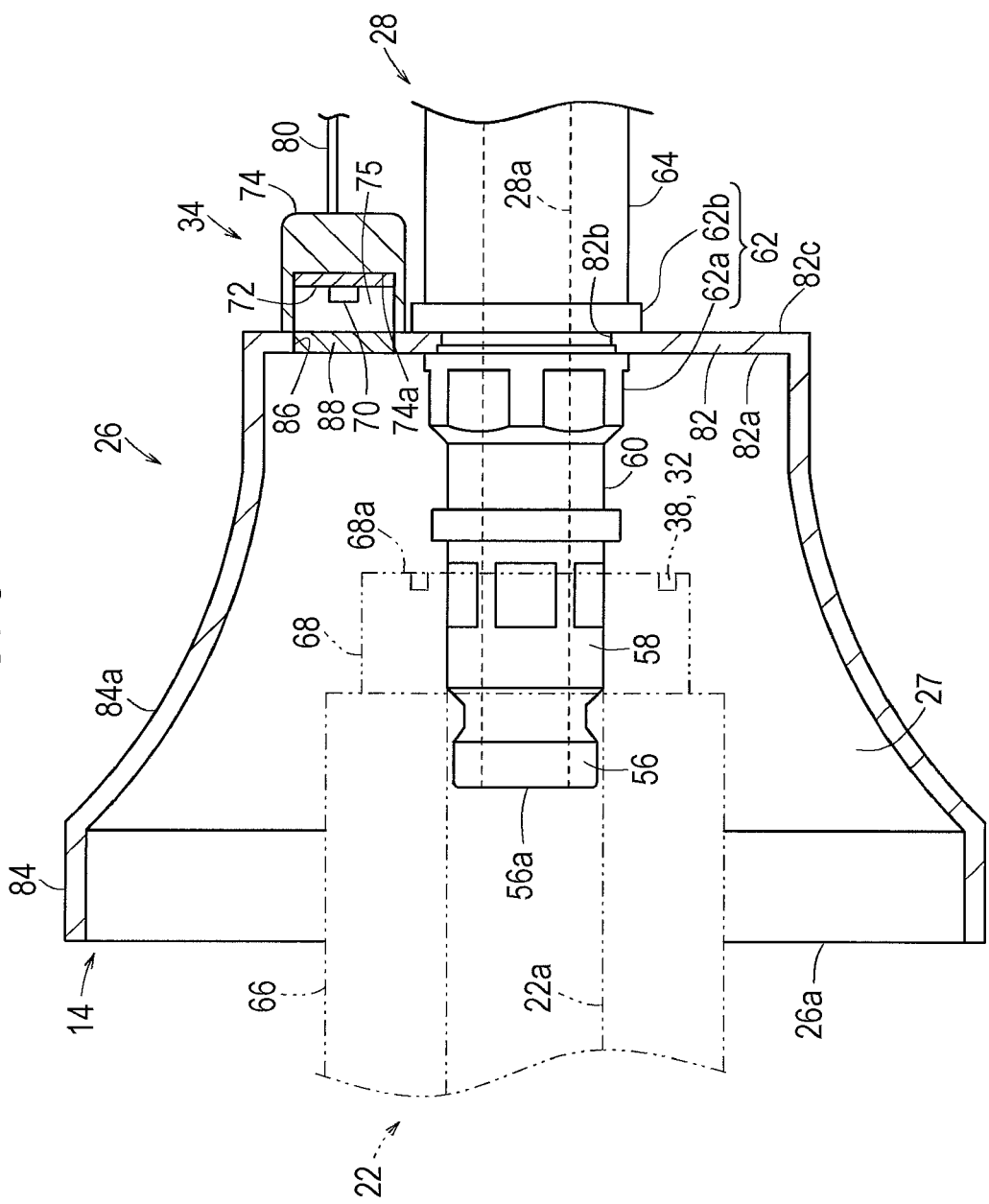

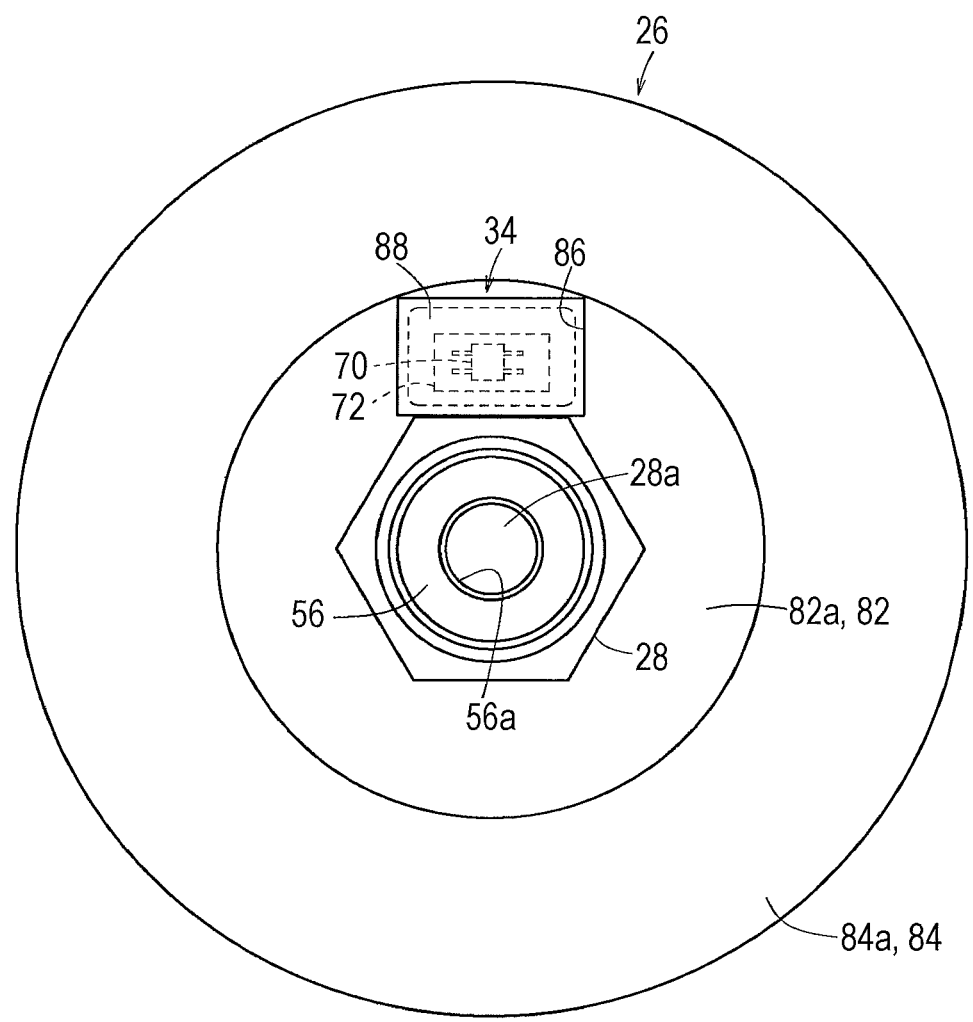

FUEL CELL VEHICLE

CROSS-REFERENCE TO RELATED APPLICATIONS

The present application claims priority under 35 U.S.C. §119 to Japanese Patent Application No. 2012-277338, filed Dec. 19, 2012, entitled "Fuel Cell Vehicle." The contents of this application are incorporated herein by reference in their entirety.

BACKGROUND

1. Field

The present disclosure relates to a fuel cell vehicle.

2. Description of the Related Art

As for systems configured to fill fuel gas to fuel cell vehicles, in recent years, there has been attention given to a system configured to fill fuel gas while transmitting information of a fuel cell vehicle to a station which is a supply source of fuel gas (hereinafter, referred to as communication filling system). With this communication filling system, a station supplies fuel gas to a vehicle while monitoring states such as a pressure value and a temperature value and so forth of a tank on the vehicle side, thereby controlling supply amount and supply speed of fuel gas, and enabling effective filling to be performed.

The communication filling system is configured to implement infrared communication between a nozzle on a station side, and a receptacle on a fuel cell vehicle side. Specifically, a transmitting element configured to transmit (emit) infrared light is provided to the receptacle, and a receiving element configured to receive this infrared light is provided to the nozzle, thereby wirelessly communicating information of the tank on the vehicle side.

For example, in Japanese Unexamined Patent Application Publication No. 2010-255754, there has been disclosed a fuel cell vehicle configured to perform, by attaching a communication instrument to a receptacle of the vehicle, wireless communication with the communication instrument on a nozzle side. The communication instrument on the receptacle side is screwed to a flange portion formed in a protruding manner so as to circulate around the outer circumference of the receptacle, and is integrally assembled within a lid box (fuel inlet box) of the vehicle.

SUMMARY

According to one aspect of the present invention, a fuel cell vehicle includes a fuel cell, a storage device, a receptacle, a housing, and a vehicle side communication device. The fuel cell is to generate electric power using fuel gas and oxidant gas. The storage device is to store the fuel gas. The receptacle to which a nozzle configured to supply the fuel gas is to be connected and through which the fuel gas is to be introduced from the nozzle to the storage device. The housing has a bottom wall recessed from a surface of a body of the fuel cell vehicle by a predetermined depth. The receptacle protrudes from a bottom face of the bottom wall to an inner space of the housing. The vehicle side communication device is provided to the housing on an outer circumferential side of the receptacle. The vehicle side communication device is configured to wirelessly communicate with a nozzle side communication device provided to the nozzle. The vehicle side communication device is disposed on a deeper side than the bottom face of the bottom wall and/or is disposed via a partition wall configured to shield the vehicle side communication device from the fuel gas in the inner space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 is a side-face cross-sectional view illustrating a connection relation between the nozzle and receptacle of the fuel cell vehicle in FIG. 1.

FIG. 4 is a front view illustrating the receptacle and vehicle side communication device in FIG. 3.

DESCRIPTION OF THE EMBODIMENTS

Figure 1:
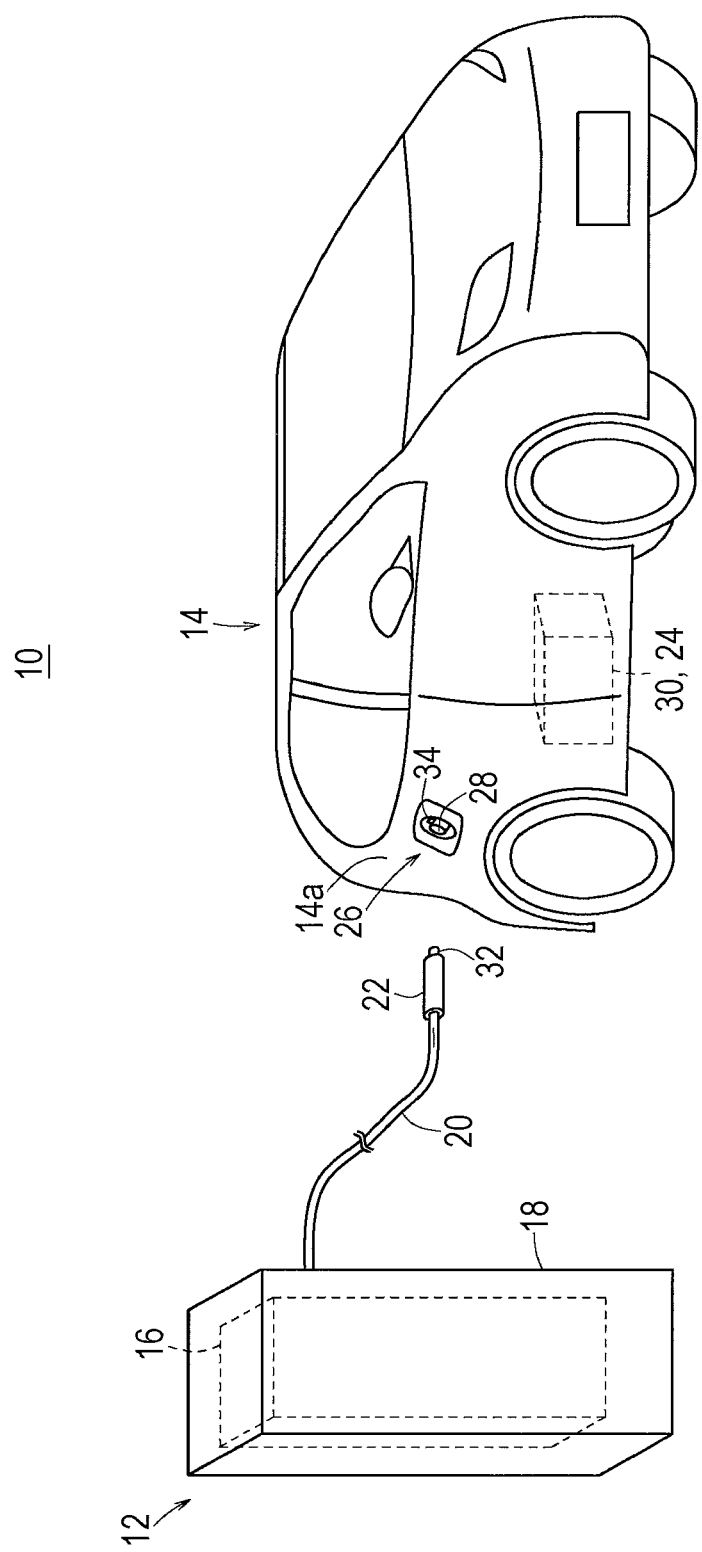
FIG. 1 is a schematic explanatory diagram illustrating a fuel cell vehicle according to a first embodiment of the present disclosure, and a communication filling system for supplying fuel gas to the fuel cell vehicle.

The embodiments will now be described with reference to the accompanying drawings, wherein like reference numerals designate corresponding or identical elements throughout the various drawings.

The fuel cell vehicle makes up a part of a communication filling system wherein fuel gas is filled while performing information communication with a supply source of fuel gas. The communication filling system makes up a filling line configured to perform fuel supply and a communication line configured to perform information communication by mutual connection between a supply source and the vehicle. Therefore, with the following description, first to fourth embodiments will be specifically described with relationship with the communication filling system regarding the fuel cell vehicle.

First Embodiment

As illustrated in FIG. 1, a communication filling system 10 is configured of a hydrogen station 12 which is a supply source, and a fuel cell vehicle 14 according to the first embodiment (hereinafter, simply referred to as vehicle 14).

The hydrogen station 12 is, in order to supply fuel gas (hydrogen gas) which is chemical energy, installed in a location adjacent to a road in the same way as with a gas station, for example. This hydrogen station 12 includes a hydrogen station main unit 18 internally including a supply side tank 16 (hydrogen tank) configured to store fuel gas, a hose 20 of which one edge is connected to the supply side tank 16, and a nozzle 22 (feeder) connected to the other edge of the hose 20. The nozzle 22 is configured, in order to fill fuel gas to the vehicle 14, so as to connect to a receptacle 28 (receptor) of the vehicle 14. The hydrogen station 12 guides, in a state in which the nozzle 22 is connected to the receptacle 28, fuel gas from the supply side tank 16 to the nozzle 22 via the hose 20 according to predetermined operations, and fills this fuel gas to the vehicle 14 from the nozzle 22.

The vehicle 14 connected to the hydrogen station 12, on which a fuel cell system 24 configured to generate electric power according to electrochemical reaction between fuel gas and oxidant gas (e.g., air) is mounted, drives with this fuel cell system 24 as a power source. A fuel inlet box 26 (housing) configured to take fuel gas into the vehicle 14 is provided to a rearward portion on the side face of a body 14a making up the appearance of the vehicle 14, and the receptacle 28 connectable to the nozzle 22 is fixed to this fuel inlet box 26. The receptacle 28 is connected to a vehicle side tank 30 (storage unit) within the vehicle 14. In the event of filling fuel gas, the receptacle 28 and the nozzle 22 of the hose 20 tip are connected by hand, thereby establishing communication between the supply side tank 16 and the vehicle side tank 30, that is, a filling line.

On the other hand, a communication line between the hydrogen station 12 and the vehicle 14 is established by establishing wireless communication between a supply side communication device 32 provided to the tip of the nozzle 22, and a vehicle side communication device 34 provided to the outer circumferential side of the receptacle 28 (infrared communication). Hereinafter, a configuration of the communication filling system 10 including the communication line will specifically be described with reference to FIG. 2.

The hydrogen station main unit 18 includes the supply side tank 16, and a filling control unit 36 configured to control the hydrogen station 12. The filling control unit 36 performs control, such as monitoring of a storage state of fuel gas within the supply side tank 16, detection of a connection state between the vehicle 14 and nozzle 22, and on/off of filling of fuel gas, and so forth. Further, the filling control unit 36 also has a function to recognize (monitor) the state of the vehicle side tank 30 and to control supply amount and supply speed of fuel gas when filling fuel gas.

Also, the supply side communication device 32 is provided to the nozzle 22 of the hydrogen station 12 as described above, and this supply side communication device 32 is electrically connected to the filling control unit 36. The supply side communication device 32 includes multiple receiving elements 38 (receiving units: see FIG. 3) configured to receive infrared light and to convert into an electric signal, and electric circuits (not illustrated) configured to convert current signals of the receiving elements 38 into voltage signals and to amplify and transmit these to the filling control unit 36. As for the receiving elements 38, various devices capable of receiving infrared light (radio signals) may be employed, for example, photodiodes (PD) may be employed.

The fuel cell system 24 to be mounted on the vehicle 14 includes the above-described vehicle side tank 30, a fuel cell 42 (hereinafter, also referred to as FC 42) to be connected to the vehicle side tank 30 via a fuel gas channel, and a filling ECU 44 (Electronic Control Unit) configured to monitor the state of fuel gas to be filled in the vehicle side tank 30. The FC 42 is configured by multiple fuel cells being laminated, generates electric power based on supply of fuel gas from the vehicle side tank 30 and supply of oxidant gas (compressed air) from a compressor 46, and outputs high voltage. Note that, an arrangement may be made wherein the fuel cell system 24 includes a channel (not illustrated) configured to circulate fuel gas, oxidant gas, or reaction product, and a mechanism reusing these, or the like, is provided to the vehicle 14.

With the vehicle side tank 30, there are provided a pressure sensor 48 configured to detect pressure within the vehicle side tank 30 (gas pressure) and to output a pressure value p, and a temperature sensor 50 configured to detect temperature (gas temperature) within the vehicle side tank 30 and to output a temperature value t. The pressure sensor 48 and temperature sensor 50 are electrically connected to the filling ECU 44, and transmit the detection signals of the pressure value p and temperature value t to the filling ECU 44.

The filling ECU 44 includes a CPU, memory, an interface, a timer (which are not illustrated), and so forth, and is configured so as to perform processing based on a predetermined program. For example, the filling ECU 44 performs processing to encode the pressure value p transmitted from the pressure sensor 48 and the temperature value t transmitted from the temperature sensor 50 as state information of the vehicle side tank 30 which the hydrogen station 12 can receive (hereinafter, referred to as transmission information f), and to output these to the vehicle side communication device 34, and so forth.

Also, the fuel inlet box 26 of the vehicle 14 serves as an inlet unit configured to connect an outside environment and the fuel cell system 24, and as described above, the receptacle 28 and vehicle side communication device 34 are housed therein. The fuel inlet box 26 is closed by a lid 52 at the time of a normal state in which fuel gas is not being filled. The lid 52 is mechanically connected to a lid opener 54 configured to perform opening/closing of the lid 52, and opening/closing drive of the lid opener 54 is controlled by the filling ECU 44. Also, it is desirable to provide a detection sensor (not illustrated) configured to detect a connection state between the nozzle 22 and receptacle 28 and to transmit a detection signal to the filling ECU 44, to the fuel inlet box 26. The filling ECU 44 recognizes connection of the nozzle 22 as to the receptacle 28 based on the detection result by the detection sensor, and implements opening/closing of a valve (not illustrated) provided to a pipe 40 for circulation of fuel gas, or generation and output of the transmission information f.

As illustrated in FIGS. 3 and 4, the receptacle 28 and vehicle side communication device 34 are each installed in the fuel inlet box 26 in a mutually directly non-contact state (non-contact state).

The receptacle 28 is formed of a metal material in a cylindrical shape, and protrudes toward outside of the vehicle 14 from the bottom wall 82 of the fuel inlet box 26 by a predetermined length. With the receptacle 28, a tip insertion portion 56, a fitting portion 58, a protrusion supporting portion 60, a box connecting portion 62, and an in-vehicle pipe connecting portion 64 are formed toward a base end direction (inner side) from the tip externally protruded. Also, a vehicle side channel 28a is formed within the receptacle 28 in an intruding manner along the axial center.

On the other hand, the nozzle 22 is formed in a slightly thicker cylindrical shape than the receptacle 28 so that an operator can readily hold the nozzle 22 to guide to the fuel inlet box 26. Specifically, the nozzle 22 includes a cylindrical body portion 66 having predetermined length in the axial direction, and a fitted portion 68 continuing to the tip of the body portion 66 and formed in a smaller circular shape than this body portion 66. With the fitted portion 68, an edge face 68a is formed in a flat shape, and the supply side communication device 32 is provided therein. With the receiving elements 38 of the supply side communication device 32 are embedded so that the reception face of infrared light makes up an even face as to the edge face 68a. Also, a supply side channel 22a is provided to the inside of the nozzle 22 along the axial center, and this supply side channel 22a continues into a fuel gas guide route (not illustrated) within the hose 20.

The tip insertion portion 56 of the receptacle 28 is formed with an outer diameter which can be inserted into the supply side channel 22a of the nozzle 22. This tip insertion portion 56 has a tip opening 56a continuing to the vehicle side channel 28a. In a connection state between the nozzle 22 and receptacle 28, the supply side channel 22a is communicated with the vehicle side channel 28a.

The fitting portion 58 continuing to the base end side of the tip insertion portion 56 is formed so that the outer diameter thereof generally matches the inner diameter of the supply side channel 22a of the nozzle 22, and relative movement between the nozzle 22 and receptacle 28 is regulated by being fitted in the fitted portion 68 (supply side channel 22a) at the time of inserting the nozzle 22 into the receptacle 28. In this state, the outer circumferential face of the fitting portion 58 and the inner circumferential face of the fitted portion 68 are mutually in contact. That is to say, with the communication filling system 10, filling of fuel gas can be implemented by fitting between the fitted portion 68 and fitting portion 58. The nozzle 22 can be connected to the receptacle 28 without regulating a position in the circumferential direction as to the receptacle 28, that is, with optional phase difference. Thus, the operator can readily connect the nozzle 22 to the receptacle 28 at the time of performing filling operations.

The protrusion supporting portion 60 continuing to the base end side of the fitting portion 58 is formed thicker than the fitting portion 58 and protrudes in the axial direction by a predetermined length. Insertion of the tip portion (fitted portion 68) of the nozzle 22 is regulated at the fitting portion 58, and accordingly, in a connection state between the nozzle 22 and receptacle 28, the edge face 68a of the fitted portion 68 and the vehicle side communication device 34 are positioned with a predetermined interval therebetween.

The box connecting portion 62 continuing to the base end portion of the protrusion supporting portion 60 including an expanded diameter portion 62a thicker than the protrusion supporting portion 60, and a nut 62b to be implemented from the base end side, is a portion to be directly assembled in the fuel inlet box 26. Assembling of the receptacle 28 is realized by sandwiching the bottom wall 82 of the fuel inlet box 26 between the expanded diameter portion 62a and nut 62b. Also, the in-vehicle pipe connecting portion 64 continuing to the base end side of the box connecting portion 62 is a portion to be connected to the pipe 40 continuing to the vehicle side tank 30 (see FIG. 2).

The receptacle 28 is assembled as described above, and accordingly, the tip insertion portion 56 and fitting portion 58 are disposed in a predetermined position within the fuel inlet box 26. The vehicle side communication device 34 is attached to the fuel inlet box 26 so as to be positioned upward (outer circumference) of this receptacle 28. In this manner, the vehicle side communication device 34 is attached to the upward side of the receptacle 28, whereby the vehicle side communication device 34 can reduce effects of water and dust retained in the fuel inlet box 26.

The fuel inlet box 26 is formed in a cap shape so as to house the tip insertion portion 56, fitting portion 58, protrusion supporting portion 60, and expanded diameter portion 62a of the receptacle 28. This fuel inlet box 26 has the bottom wall 82 recessed from the surface of the body 14a of the vehicle 14 by a predetermined depth, and the side wall 84 continuing to the circumferential edge of the bottom wall 82 and formed across the body 14a side. The facing surface of the bottom wall 82 is formed in an exposed exit 26a opened to the outer side. Inner space 27 surrounded by the bottom wall 82 and side wall 84 is formed within the fuel inlet box 26, and this inner space 27 continues to the exposed exit 26a.

With the bottom wall 82, the bottom face 82a facing the inner space 27 is formed in a flat shape, and has a hole portion 82b passing through the receptacle 28, at the central portion. The receptacle 28 is, as described above, fixed to the bottom wall 82 by sandwiching between the expanded diameter portion 62a and nut 62b, and fixedly held in a state protruding in a direction orthogonal to the bottom face 82a. Also, an opening portion 86 passing through the bottom face 82a and rear face 82c is formed above the hole portion 82b of the bottom wall 82. Further, the vehicle side communication device 34 is attached to a position overlapped with the opening portion 86 at the rear face 82c of the bottom wall 82.

The opening portion 86 is formed in a rectangular shape corresponding to the lateral width and vertical width of the front face side of the vehicle side communication device 34. A shielding cover 88 (partition wall) configured to shield fuel gas toward the vehicle side communication device 34 is fitted in this opening portion 86. The shielding cover 88 is housed in the opening portion 86, and a circumferential edge portion thereof is tightly joined by adhesive joining, crimping, screwing, or the like. Accordingly, depth sides of the inner space 27 and fuel inlet box 26 are in a spatially shielded (separated) state. Note that the shielding cover 88 is fixed flush to the bottom face 82a so as to prevent dust or the like from being retained, but it goes without saying that the shielding cover 88 does not have to be fixed flush to the bottom face 82a.

The shielding cover 88 is configured of a polymer which can shield hydrogen gas which is fuel gas, and also can transmit infrared light, and is formed in a rectangular shape generally matching the opening portion 86. The material making up the shielding cover 88 is not restricted to any particular material, and examples thereof include polyamide, polycarbonate, polytetrafluoroethylene polyurethane (polystyrene polyester), ABS resin, acrylic resin, and polyacetal resin. It goes without saying that the material of the shielding cover 88 is not restricted to polymers, and other material such as glass, ceramic, metal, or the like may be employed, or multiple materials may be combined.

The side wall 84 continuing to the circumferential edge portion of the bottom wall 82 extends, in a side face cross-sectional view, generally in parallel with the receptacle 28 from the connection portion to a middle position, and widens in the diameter direction toward the tip side (out-of-vehicle side) from the middle position. The sided wall 84 extends again generally in parallel at the tip portion, thereby making up the exposed exit 26a. The divergent portion of the side wall 84 is formed in a curved portion 84a (guide portion) gently curved toward the tip side. This curved portion 84a has a function to smoothly guide gas existing in the inner space 27 to the outside. Note that the curved portion 84a according to the first embodiment is, as illustrated in FIG. 3, formed in the entire circumferential direction of the side wall 84, but in particular, in the event that fuel gas is hydrogen gas, an arrangement may be made where the curved portion 84a is formed only on the upward direction of the receptacle 28, taking increase of hydrogen gas level into consideration.

The exposed exit 26a is closed by the lid 52 (see FIG. 2), and exposes the inner space 27 along with opening of the lid 52 at the time of connection with the nozzle 22.

Figure 5A:
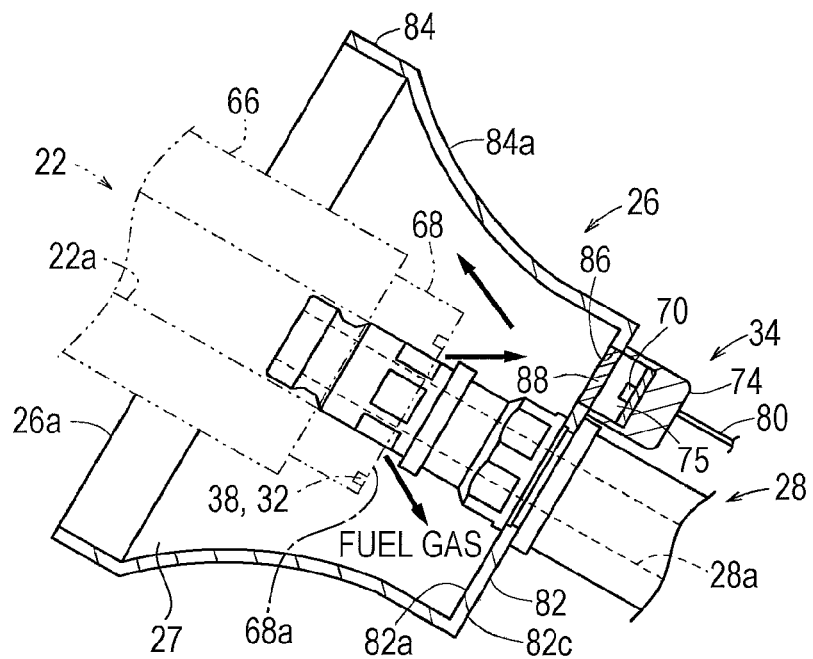
FIG. 5A is a side-face cross-sectional view illustrating a state in which fuel gas leaks from the nozzle.
Figure 5B:
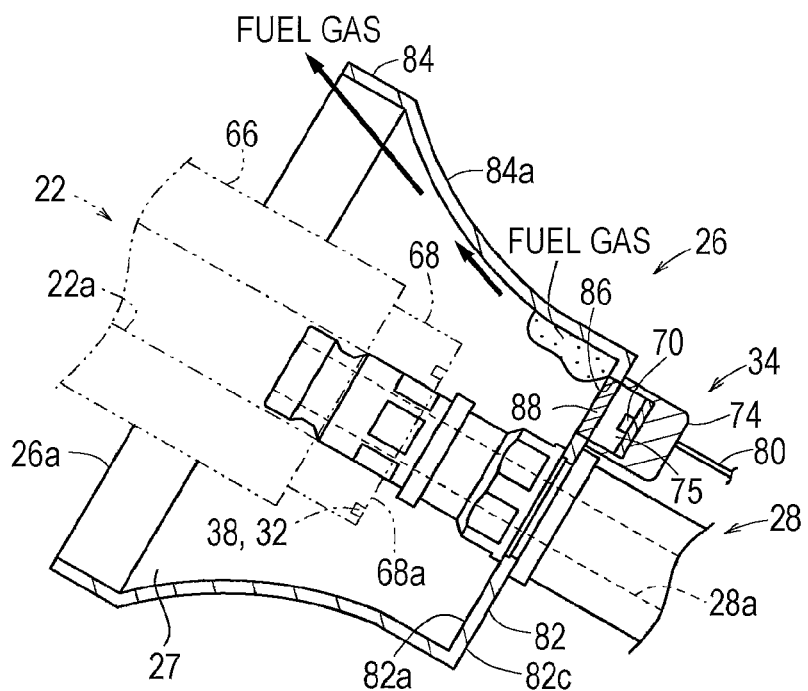
FIG. 5B is a side-face cross-sectional view illustrating flowing of fuel gas within a fuel inlet box.

With regard to the fuel inlet box 26, a state in which the fuel inlet box 26 faces the lateral direction in the page space is illustrated in FIG. 3, but in reality, the fuel inlet box 26 is provided to the body 14a of the vehicle 14 so that the entire fuel inlet box 26 inclines upward (see FIGS. 5A and 5B). Along therewith, the receptacle 28 and vehicle side communication device 34 are also attached in a manner inclined obliquely upward.

The vehicle side communication device 34 to be attached to the fuel inlet box 26 is configured as a separate unit from the receptacle 28, and fixed to the rear face 82c of the bottom wall 82. The vehicle side communication device 34 includes a transmitting element 70 (transmission unit) configured to perform infrared communication with a receiving element 38, a substrate 72 where the transmitting element 70 is mounted, and a case 74 configured to house the transmitting element 70 and substrate 72.

As the transmitting element 70, there may suitably be employed a light-emitting diode (LED) configured to emit infrared light with a predetermined wavelength. This transmitting element 70 flashes (on/off) based on the transmission information f transmitted from the filling ECU 44 to the substrate 72. Also, as the transmitting element 70, in order to widen the directivity angle of infrared light, one with no bullet type exterior provided thereto is employed.

The substrate 72 is formed in a rectangular shape longer in the horizontal direction in a front view (see FIG. 4), and is fixed to a base 74a within the case 74 by screwing, adhesive bonding, or the like. The transmitting element 70 is implemented in generally the horizontal and vertical central portion of the substrate 72, but in order to take a facing relation with the receiving element 38 into consideration, the transmitting element 70 may be disposed on the lower side of the case 74. An electric circuit (not illustrated) is formed on the substrate 72, this electric circuit is electrically connected to the filling ECU 44, and performs control such as converting the transmission information f of the filling ECU 44 which is a voltage value into a current value, or the like.

The case 74 is formed in a generally rectangular shape having housing space 75 of which the front face is exposed. The transmitting element 70 and substrate 72 are housed in the housing space 75 of the case 74. Also, with an inner side face making up the housing space 75 of the case 74, a reflecting face (not illustrated) configured to reflect the infrared light of the transmitting element 70 to the front face side is formed. Further, a harness 80 to be connected to the substrate 72 is extended from the rear face of the case 74.

The vehicle side communication device 34 is attached to the fusel inlet box 26 separately from the receptacle 28 in a state serving as a unit wherein the transmitting element 70 and substrate 72 are housed in the case 74. At the time of attachment, the case 74 is joined to the rear face 82c side of the bottom wall 82 so that the housing space 75 of the case 74 matches the opening portion 86. It is desirable to employ an adhesive agent so that the fuel inlet box 26 and case 74 are mutually joined without a gap.

The vehicle side communication device 34 is joined to the bottom wall 82, and accordingly, the housing space 75 is covered with the shielding cover 88, and the front face thereof is closed. Accordingly, water, dust, and so forth are prevented from entering the housing space 75.

Figure 2:
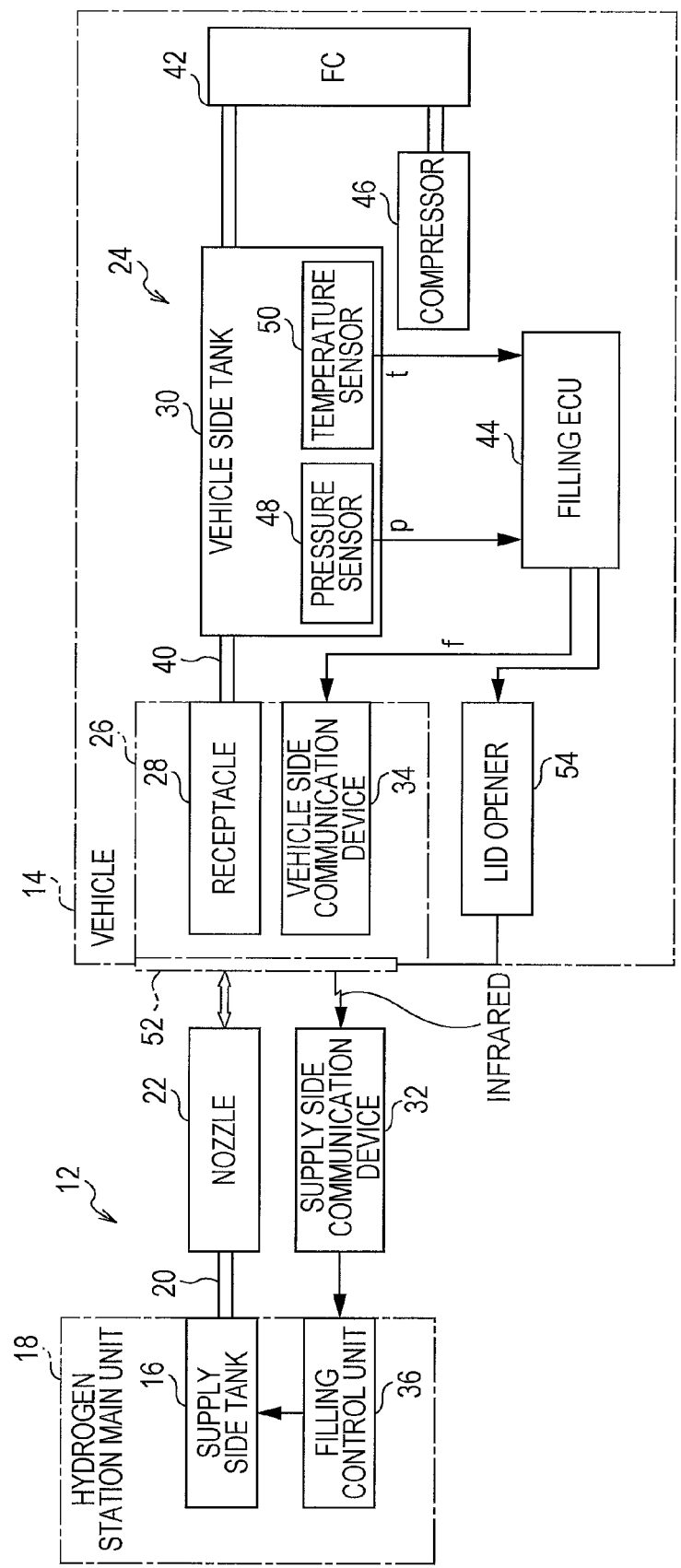
FIG. 2 is a functional block diagram illustrating the communication filling system in FIG. 1.

The fuel cell vehicle 14 according to the first embodiment is configured basically as described above, and hereinafter, operations and advantages thereof will be described with reference to FIG. 2, and FIGS. 5A and 5B.

In the event of filling fuel gas in the vehicle 14, the vehicle 14 is brought closer to the hydrogen station 12, the lid opener 54 is driven by predetermined operations to open the lid 52 and to open the fuel inlet box 26. The nozzle 22 is advanced toward the receptacle 28 so that the receptacle 28 protruding within the fuel inlet box 26 is inserted into the supply side channel 22a of the nozzle 22, thereby fitting the nozzle 22 in the receptacle 28. According to mechanical connection between the nozzle 22 and receptacle 28, the vehicle side communication device 34 (transmitting element 70) and supply side communication device 32 (receiving element 38) are disposed with an interval whereby infrared communication can be performed.

After connection between the nozzle 22 and receptacle 28, filling of fuel gas as to the vehicle 14 is started. The fuel gas is guided from the supply side tank 16 to the nozzle 22 via the hose 20, and further moves to the vehicle side channel 28a of the receptacle 28 from the supply side channel 22a of the nozzle 22. The fuel gas is supplied and stored from the receptacle 28 to the vehicle side tank 30 via the pipe 40. At the vehicle side tank 30, fuel gas is filled until the stored fuel gas reaches predetermined amount (e.g., amount whereby gas pressure becomes 35 MPa), but increase in temperature occurs as internal pressure of the vehicle side tank 30 increases at the time of filling. The pressure sensor 48 and temperature sensor 50 provided to the vehicle side tank 30 detect pressure and temperature of the vehicle side tank 30, and output the pressure value p and temperature value t to the filling ECU 44, respectively.

The filling ECU 44 generates transmission information f from the pressure value p and temperature value t to output to the vehicle side communication device 34. Upon receiving the transmission information f, the vehicle side communication device 34 flashes (on/off) the transmitting element 70 based on this transmission information f, and emits infrared light to the receiving element 38. The supply side communication device 32 including the receiving element 38 receives this infrared light, thereby receiving the transmission information f and transmitting to the filling control unit 36.

The filling control unit 36 adjusts, based on this transmission information f, supply amount and supply speed of fuel gas being filled. Thus, fuel gas can be supplied according to the state of the vehicle side tank 30, and effective filling of fuel gas can be performed.

Incidentally, with the nozzle 22 and receptacle 28, in order to secure operability of connection and disconnection, some room occurs in a connection state thereof instead of a complete tight state. Thus, as illustrated in FIG. 5A, there is a possibility that fuel gas will be blown out (leaked) between the nozzle 22 and receptacle 28.

Therefore, with the fuel cell vehicle 14 according to the first embodiment, the vehicle side communication device 34 is attached to the rear face 82c side of the bottom wall 82 of the fuel inlet box 26, thereby sufficiently separating from the tip of the nozzle 22 (the edge face 68a of the fitted portion 68). Thus, even when fuel gas leaks from the nozzle 22, the fuel gas is externally discharged along the curved portion 84a without traveling to the upper side corner of the fuel inlet box 26. Accordingly, the fuel gas is prevented from coming into contact with the vehicle side communication device 34.

In addition to this, the vehicle side communication device 34 is provided to the bottom wall 82 of the fuel inlet box 26, thereby widening an irradiation range of infrared light that the transmitting element 70 emits. Thus, with the edge face 68a of the nozzle 22 where the receiving element 38 is disposed, a sufficiently wide radio transmission range can be formed, and a more secure communication line can be built between the supply side communication device 32 and the vehicle side communication device 34.

Also, the front face of the vehicle side communication device 34 is covered with the shielding cover 88, and accordingly, even when fuel gas directly directs to the vehicle side communication device 34, the fuel gas can be shielded by the shielding cover 88 in a sure manner. As a result thereof, fuel gas can be prevented from causing adverse effects on the vehicle side communication device 34 (e.g., degeneration due to hydrogen).

Also, fuel gas leaks from the nozzle 22 relatively large amount, and accordingly, even when operating so as to cause retention of fuel gas around the upper side corner of the fuel inlet box 26, as illustrated in FIG. 5B, fuel gas can actively be made to flow outward along the curved portion 84a, since the curved portion 84a is formed on the side wall 84 of the fuel inlet box 26. In particular, as illustrated in FIGS. 5A and 5B, the entire fuel inlet box 26 is formed in the body 14a inclined obliquely upward, and accordingly, fuel gas can further readily be discharged. As a result thereof, fuel gas is prevented from being retained in the fuel inlet box 26, and accordingly, fuel gas can be prevented from being continuously retained to cause adverse effects on the vehicle side communication device 34.

Note that the fuel cell vehicle 14 according to the first embodiment is not restricted to the above configuration, and can assume various configurations. Hereinafter, other configuration examples will be described with reference to FIGS. 6A to 6C. Note that, with the following description, the same configuration and same function as with the fuel cell vehicle 14 according to the first embodiment will be denoted with the same reference numeral, and detailed description thereof will be omitted.

Figure 6A:
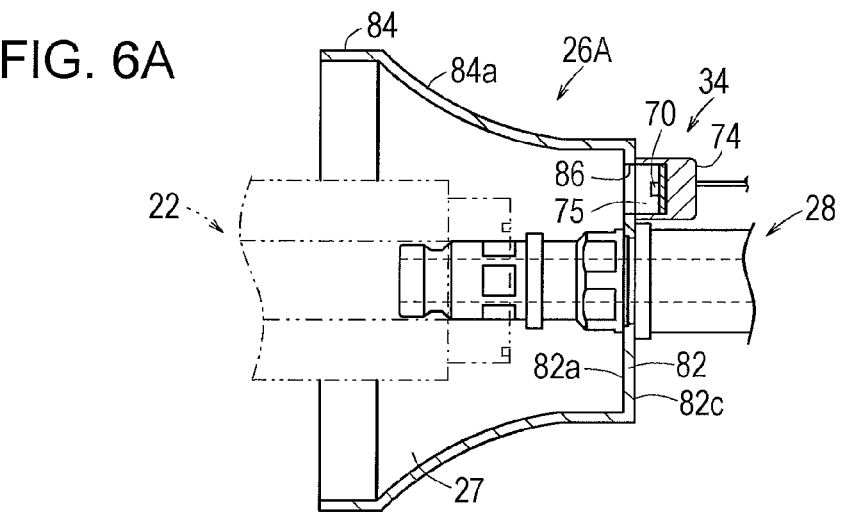
FIG. 6A is a side-face cross-sectional view illustrating a fuel inlet box and vehicle side communication device according to a first configuration example.

A fuel inlet box 26A according to a first configuration example illustrated in FIG. 6A differs from the fuel inlet box 26 according to the first embodiment in that the shielding cover 88 is not provided to the opening portion 86. Specifically, with the vehicle side communication device 34, the housing space 75 of the case 74 communicates with the inner space 27 of the fuel inlet box 26A. In this manner, even when the shielding cover 88 is not provided, the vehicle side communication device 34 is provided to the rear face 82c side of the bottom wall 82 of the fuel inlet box 26A, thereby being disposed in a position sufficiently separated from the nozzle 22. Therefore, chances of fuel gas leaking from the nozzle 22 coming into contact with the vehicle side communication device 34 can be reduced, and even if some fuel gas does come into contact, the amount thereof can be reduced.

Figure 6B:
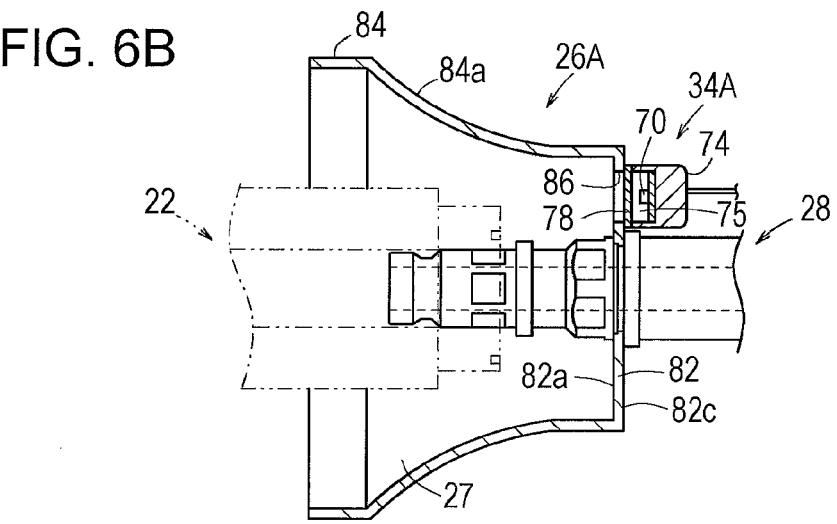
FIG. 6B is a side-face cross-sectional view illustrating a fuel inlet box and vehicle side communication device according to a second configuration example.

A fuel inlet box 26A according to a second configuration example illustrated in FIG. 6B is configured in the same way as with the first configuration example wherein the shielding cover 88 is not provided to the opening portion 86. On the other hand, a lid body 78 is attached to the front face of a vehicle side communication device 34A. This lid body 78 is, in the same way as with the shielding cover 88, configured of a material which can transmit infrared light and also shield fuel gas. Accordingly, even when fuel gas that has leaked from the nozzle 22 reaches the vehicle side communication device 34A, the fuel gas can be shielded by the lid body 78 in a sure manner.

Figure 6C:
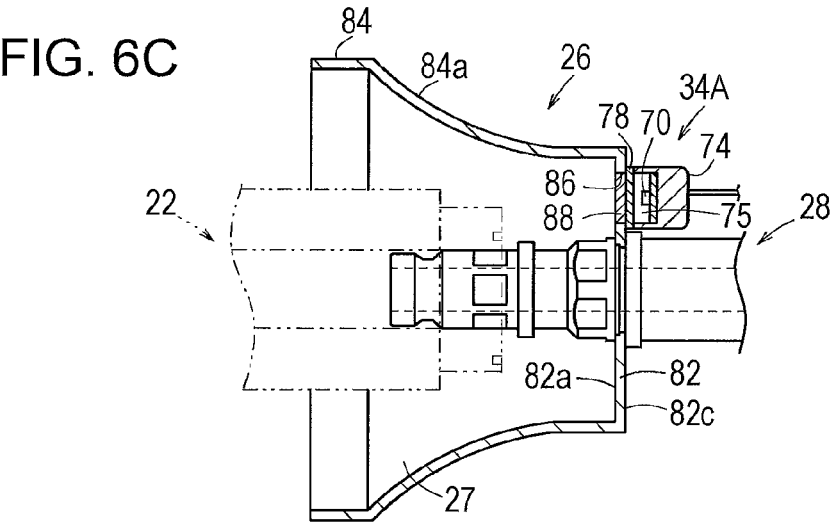
FIG. 6C is a side-face cross-sectional view illustrating a fuel inlet box and vehicle side communication device according to a third configuration example.

With a third configuration example illustrated in FIG. 6C, a configuration is employed wherein the fuel inlet box 26 to which the shielding cover 88 is provided is applied in the same way as with the first embodiment, and further the lid body 78 is attached to the front face of the vehicle side communication device 34A. Even with such a configuration, the same advantages as with the first embodiment can be obtained.

Note that, as with other configuration examples, for example, an irradiation direction of infrared light from the transmitting element 70 may be designed as appropriate by attaching the vehicle side communication device 34 to the bottom wall 82 of the fuel inlet box 26 in an inclined manner. Further, a design may be made wherein infrared light is diffused in a predetermined direction by the shielding cover 88 and lid body 78.

As described above, according to the fuel cell vehicle 14 according to the first embodiment, the vehicle side communication device 34 is disposed deeper than the bottom face 82a of the bottom wall 82 where the receptacle 28 within the fuel inlet box 26 protrudes, and accordingly, a sufficient interval can be secured between the nozzle 22 and the vehicle side communication device 34. Thus, even when fuel gas leaks from the nozzle 22, contact of fuel gas as to the vehicle side communication device 34 is significantly be suppressed, and accordingly, adverse effects due to fuel gas can be reduced.

Also, the vehicle side communication device 34 is disposed as to the inner space 27 by sandwiching the shielding cover 88 and lid body 78 which shield fuel gas therebetween, and accordingly, fuel gas which has leaked from the nozzle 22 can be prevented from directly directing to the vehicle side communication device 34 in a sure manner. Further, even when fuel gas is retained within the fuel inlet box 26, the fuel gas is shielded by the shielding cover 88 and lid body 78, and accordingly, fuel gas can be prevented from continuously causing adverse effects on the vehicle side communication device 34. That is to say, the vehicle 14 can suppress effects of fuel gas using a layout position as to the fuel inlet box 26 and the shielding cover 88, and reliability and durability of the vehicle side communication device 34 can be improved. The shielding cover 88 and lid body 78 can also protect the vehicle side communication device 34 from moisture, dust, impact, and so forth.

Further, the curved portion 84a curved obliquely upward from the bottom wall 82 is provided to the side wall 84, and accordingly, the curved portion 84a can guide fuel gas that has leaked from the nozzle 22 to the outside of the vehicle 14. Thus, fuel gas can significantly be suppressed from being retained in the fuel inlet box 26.

Further, the vehicle side communication device 34 is attached to the rear face 82c of the bottom wall 82, so there is no need to be restricted to installation within the fuel inlet box 26, whereby flexibility of layout of the vehicle side communication device 34 can be improved.

Second Embodiment

Figure 7:
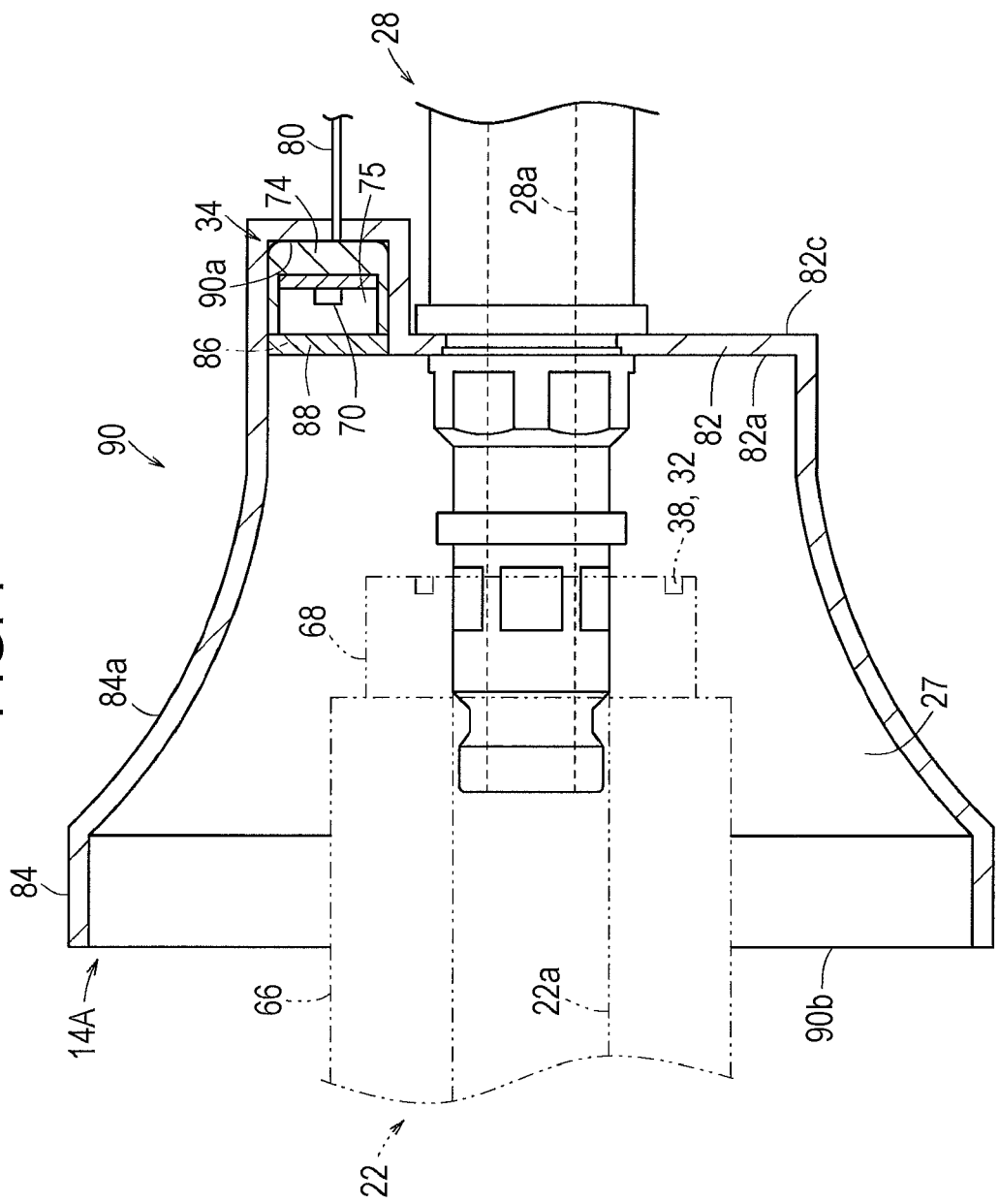
FIG. 7 is a side-face cross-sectional view illustrating a connection relation between a receptacle of a fuel cell vehicle and a nozzle, according to a second embodiment of the present disclosure.

Next, a fuel cell vehicle 14A according to a second embodiment will be described with reference to FIG. 7. The vehicle 14A includes a fuel inlet box 90 where a recessed portion 90a is formed in the bottom wall 82. The vehicle side communication device 34 is housed in this recessed portion 90a. Therefore, the recessed portion 90a is formed with a horizontal width and vertical width generally matching the outer shape of the vehicle side communication device 34, and is recessed deeper in the vehicle 14A than the bottom wall 82 so as to have depth where the opening portion 86 is formed in a state housing the vehicle side communication device 34.

The shielding cover 88 is attached to the opening portion 86 of this recessed portion 90a in a state housing the vehicle side communication device 34. Accordingly, the vehicle side communication device 34 is separated from the inner space 27 by the shielding cover 88. The shielding cover 88 is attached in an even face as to the bottom wall 82, and accordingly visual appearance is improved, and also, dust and trash are not readily collected.

With the fuel inlet box 90 thus configured, the vehicle side communication device 34 can be attached from the exposed exit 90b side (the outside of the vehicle 14A). Accordingly, after assembly of the vehicle is completed, the vehicle side communication device 34 can additionally be attached. At the time of attachment, the vehicle side communication device 34 is inserted into the recessed portion 90a of the fuel inlet box 90, and accordingly, the vehicle side communication device 34 can be positioned in a location where infrared communication can be performed, in a simple and sure manner.

Also, with connection between the nozzle 22 and receptacle 28, in the event that fuel gas has leaked from the nozzle 22, the same advantage as with the vehicle 14 according to the first embodiment can be obtained. Specifically, the vehicle side communication device 34 housed in the recessed portion 90a is deeper than the bottom wall 82, and accordingly, fuel gas does not readily reach the vehicle side communication device 34. Also, the vehicle side communication device 34 is not at the position where the fuel gas is retained. Further, fuel gas to be directly directed to the vehicle side communication device 34 can be shielded by the shielding cover 88 attached to the fuel inlet box 90. Accordingly, with the vehicle 14A as well, adverse effects due to fuel gas is reduced, and reliability and durability of the vehicle side communication device 34 can be improved.

Note that the fuel cell vehicle 14A according to the second embodiment may also assume the first to third configuration examples in the fuel cell vehicle 14 according to the first embodiment. Specifically, with the fuel cell vehicle 14A, the shielding cover 88 to be attached to the opening portion 86 may be omitted, and the vehicle side communication device 34A with the lid body 78 attached to the front face of the case 74 may be applied.

Third Embodiment

Figure 8:
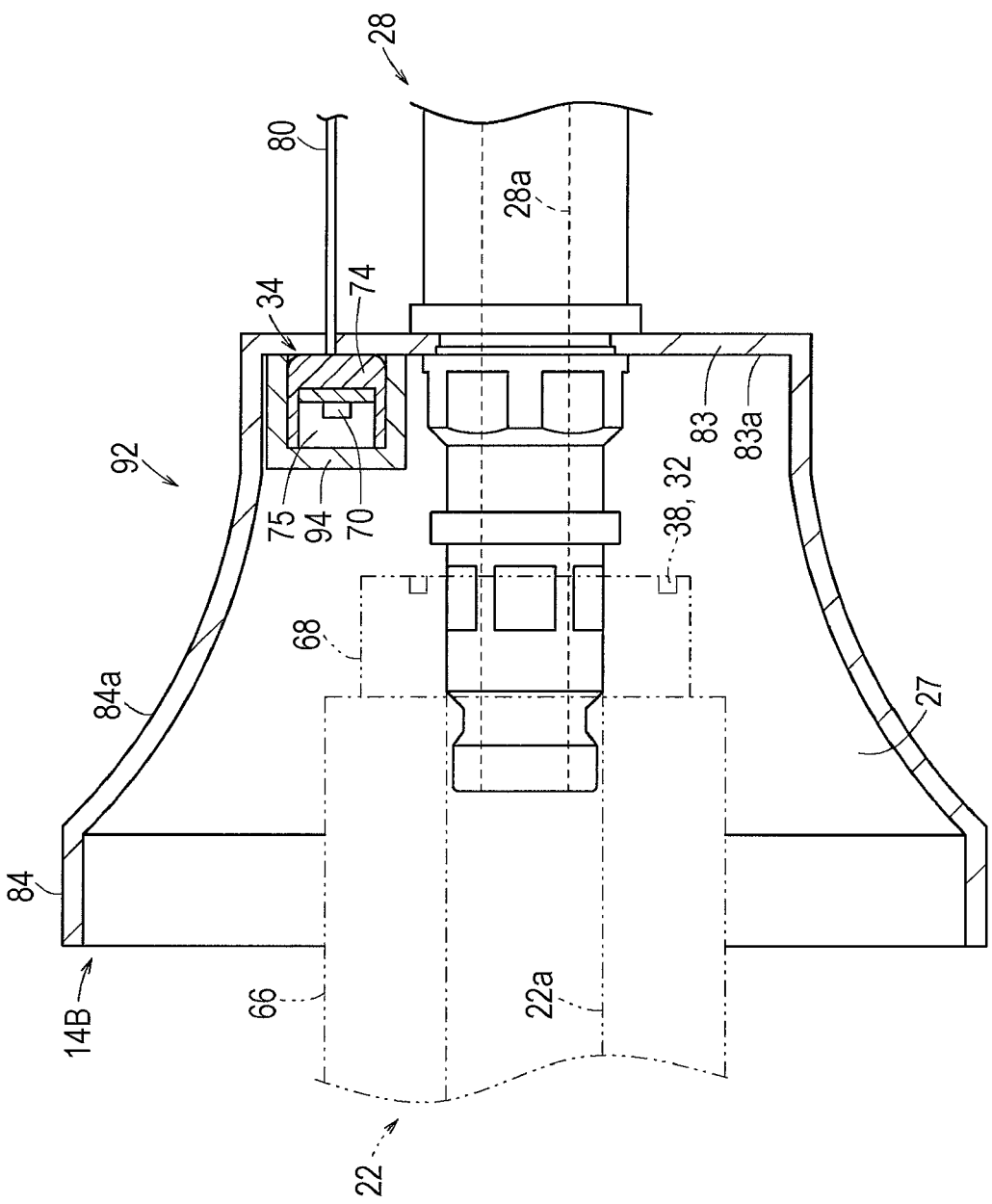
FIG. 8 is a side-face cross-sectional view illustrating a connection relation between a receptacle of a fuel cell vehicle and a nozzle, according to a third embodiment of the present disclosure.

Next, a fuel cell vehicle 14B according to a third embodiment will be described with reference to FIG. 8. The vehicle 14B employs a fuel inlet box 92 where the opening portion 86 is not provided to the bottom wall 83. The vehicle side communication device 34 is installed in the bottom face 83a of the bottom wall 83, and is configured wherein the circumference of the vehicle side communication device 34 is covered with a box-shaped cover 94 (partition wall).

The box-shaped cover 94 is configured of a material wherein infrared light is transmittable, and also, fuel gas can be shielded (e.g., a material of the shielding cover 88 exemplified). In this case, an arrangement may be made wherein the vehicle side communication device 34 is attached to the bottom face of the box-shaped cover 94, and the vehicle side communication device 34 and box-shaped cover 94 are integrated. The box-shaped cover 94 is joined to the bottom wall 83 by an adhesive agent or the like, and the vehicle side communication device 34 is isolated from the inner space 27 in an air-tight manner.

Accordingly, with connection between the nozzle 22 and the receptacle 28, in the event that fuel gas has leaked from the nozzle 22, fuel gas to be directed to the vehicle side communication device 34 can be shielded by the box-shaped cover 94. Accordingly, with the vehicle 14B as well, reliability and durability of the vehicle side communication device 34 can be improved.

Fourth Embodiment

Figure 9:
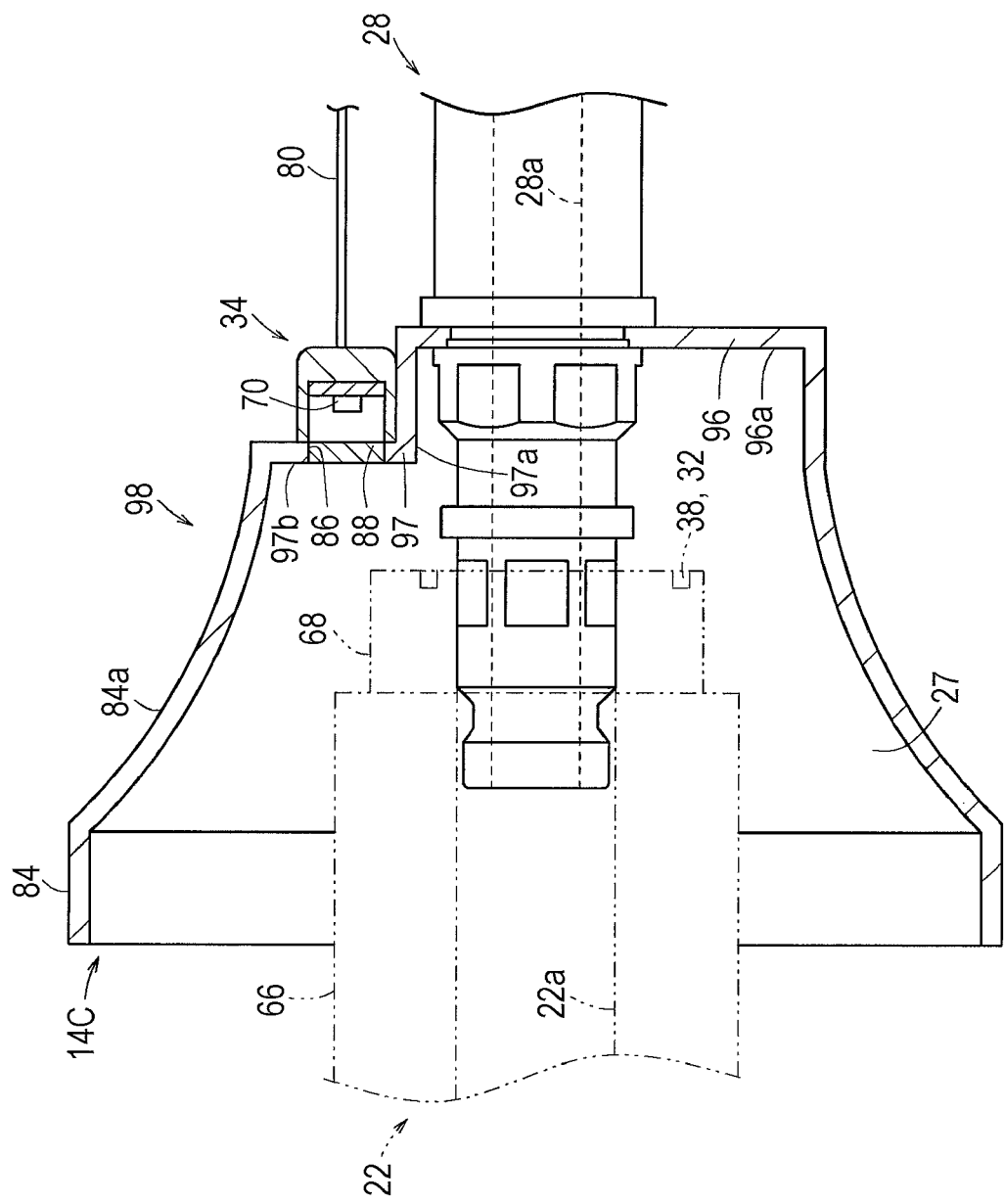
FIG. 9 is a side-face cross-sectional view illustrating a connection relation between a receptacle of a fuel cell vehicle and a nozzle, according to a fourth embodiment of the present disclosure.

Next, a fuel cell vehicle 14C according to a fourth embodiment will be described with reference to FIG. 9. The vehicle 14C employs a fuel inlet box 98 where steps 97 are formed on a bottom wall 96. The steps 97 include a wall 97a extending in parallel with the axial direction of the receptacle 28 from the bottom face 96a, and a wall 97b extending in a direction orthogonal to this wall 97a in a predetermined position. With the wall 97b, the opening portion 86 is formed, and the shielding cover 88 is attached to this opening portion 86.

The vehicle side communication device 34 is installed in a position corresponding to the opening portion 86 (shielding cover 88) on the rear face side of the steps 97. Accordingly, the vehicle side communication device 34 is isolated from the inner space 27 of the fuel inlet box 98.

Accordingly, with connection between the nozzle 22 and receptacle 28, in the event that fuel gas has leaked from the nozzle 22, the fuel gas directing to the vehicle side communication device 34 can be shielded by the steps 97 and shielding cover 88. Accordingly, with the vehicle 14C as well, reliability and durability of the vehicle side communication device 34 can be improved.

The present disclosure has been described above with reference to the suitable embodiments, but the present disclosure is not restricted to the embodiments, and it goes without saying that various modifications may be made without departing from the essence of the present disclosure.

A fuel cell vehicle according to an embodiment of the present disclosure includes: a fuel cell configured to generate electric power using fuel gas and oxidant gas; a storage unit capable of storing the fuel gas; a receptacle to which a nozzle configured to supply the fuel gas is connected, configured to introduce the fuel gas from the nozzle to the storage unit; a housing unit having a bottom wall recessed from the surface of a body by a predetermined depth, where the receptacle protrudes from the bottom wall to inner space; and a vehicle side communication device provided to the housing unit on the outer circumferential side of the receptacle, capable of wireless communication with a nozzle side communication device provided to the nozzle, with the vehicle side communication device being disposed on a deeper side than the bottom side of the bottom wall where the receptacle protrudes, and/or disposed via a partition wall configured to shield the fuel gas for the inner space.

According to the above configuration of the embodiment, the fuel cell vehicle can sufficiently secure an interval between the nozzle and the vehicle side communication device by the vehicle side communication device being disposed on a deeper side than the bottom of the bottom wall within the fuel inlet box. Thus, even when fuel gas leaks from the nozzle, the fuel gas is prevented from reaching the vehicle side communication device, and accordingly, adverse effects due to fuel gas can be reduced.

Also, the vehicle side communication device according to the embodiment is disposed via the partition wall configured to shield the fuel gas as to inner space, whereby fuel gas to be directly directed to the vehicle side communication device can be prevented in a sure manner even when the fuel gas leaks from the nozzle. Further, even when fuel gas is retained in the fuel inlet box, the fuel gas is shielded by the partition wall, and accordingly, the vehicle side communication device has no adverse effects. That is to say, the fuel cell vehicle can suppress effects of the fuel gas as to the vehicle side communication device by a layout position as to the fuel inlet box or the partition wall, and reliability and durability of the vehicle side communication device can be improved.

In this case, it is desirable that the housing unit has a side wall provided continuously to the bottom wall and extending to the body, and a guide portion curved obliquely upward from the bottom wall is formed at least on the upward side of the receptacle of the side wall. Thus, the guide portion curved obliquely upward from the bottom wall is formed at least on the upward side of the receptacle of the side wall, whereby the guide portion may guide fuel gas that has leaked from the nozzle to outside of the vehicle. Thus, the fuel gas may significantly be suppressed from being retained in the fuel inlet box.

Also, the vehicle side communication device according to the embodiment may be attached to the rear face side of the bottom wall. Thus, the vehicle side communication device is attached to the rear face side of the bottom wall, and accordingly, there is no need to seize installation restrictions within the fuel inlet box, whereby flexibility of layout of the vehicle side communication device may be improved.

Alternatively, a recessed portion recessed on a deeper side than the bottom face, in which the vehicle side communication device is housed, may be formed on the bottom wall. Thus In this manner, the fuel cell vehicle according to the embodiment includes the recessed portion recessed on a deeper side than the bottom, in which the vehicle side communication device is housed, and accordingly, the vehicle side communication device may sufficiently be separated from the nozzle, and also, the vehicle side communication device may readily be positioned.

In this case, it is desirable that the partition wall is provided to an opening of the recessed portion. Thus, the partition wall is provided to the opening of the recessed portion, and accordingly, the fuel gas may be shielded from directing to the vehicle side communication device housed within the recessed portion.

Also, an arrangement may be made wherein the housing unit is inclined upward, and provided continuously to the body. Thus, the housing unit according to the embodiment is inclined upward, and accordingly, the fuel gas that has leaked to the fuel inlet box can readily be made to flow upward, and retaining of the fuel gas within the fuel inlet box may further be reduced.

According to the embodiment, even when fuel gas leaks from a nozzle, effects of the fuel gas can significantly be reduced by a simple configuration, and thus, reliability and durability of the communication device can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell vehicle comprising:
a fuel cell to generate electric power using fuel gas and oxidant gas;
a storage device to store the fuel gas;
a receptacle to which a nozzle configured to supply the fuel gas is to be connected and through which the fuel gas is to be introduced from the nozzle to the storage device;
a housing formed in a body of the fuel cell vehicle, the housing having a bottom wall recessed from a surface of the body of the fuel cell vehicle by a predetermined depth, the bottom wall having a bottom face on one side and a recessed portion on an other side, the receptacle protruding from the bottom face of the bottom wall to an inner space of the housing; and
a vehicle side communication device provided to the housing on an outer circumferential side of the receptacle, the vehicle side communication device being configured to wirelessly communicate with a nozzle side communication device provided to the nozzle, the vehicle side communication device being disposed deeper in the vehicle than the bottom face of the bottom wall and being disposed via a partition wall configured to shield the vehicle side communication device from the fuel gas in the inner space,
wherein the recessed portion recessed deeper in the vehicle than the bottom face is formed into the bottom wall,
wherein the vehicle side communication device is housed in the recessed portion, and
wherein the partition wall prevents fuel gas from directly contacting the vehicle side communication device.

2. The fuel cell vehicle according to claim 1,
wherein the housing has a side wall provided extending continuously to the bottom wall and extending to the body, and
wherein the side wall includes a guide portion curved obliquely upward from the bottom wall and provided at least on an upward side of the receptacle.

3. The fuel cell vehicle according to claim 1, wherein the vehicle side communication device is attached to a rear face side of the bottom wall.

4. The fuel cell vehicle according to claim 1, wherein the partition wall is provided to an opening of the recessed portion.

5. The fuel cell vehicle according to claim 1, wherein the housing is inclined upward and provided continuously to the body.

6. The fuel cell vehicle according to claim 1,
wherein the vehicle side communication device includes a transmitting element configured to perform infrared communication with the nozzle side communication device,
wherein an end of the receptacle is provided on a first side with respect to the bottom face of the bottom wall, and
wherein the transmitting element is provided on a second side with respect to the bottom face of the bottom wall, the second side being opposite to the first side with respect to the bottom face of the bottom wall.

7. The fuel cell vehicle according to claim 1,
wherein the receptacle has a tip opening through which the fuel gas is to be introduced from the nozzle to the storage device, and
wherein the bottom wall of the housing is provided in parallel to the tip opening.

8. The fuel cell vehicle according to claim 1,
wherein the recessed portion is formed on a deeper side than a surface which the receptacle penetrates.

9. A fuel cell vehicle comprising:
a fuel cell to generate electric power using fuel gas and oxidant gas;
a storage device to store the fuel gas;
a housing formed in a body of the fuel cell vehicle, the housing having a bottom wall recessed from a surface of the body of the fuel cell vehicle;
a receptacle to which a nozzle configured to supply the fuel gas is to be connected and through which the fuel gas is to be introduced from the nozzle to the storage device, the receptacle protruding from a bottom face of the bottom wall to an inner space of the housing;
a recessed portion connected to the bottom wall, the recessed portion having an opening portion on the bottom wall and a recess that is connected to the opening portion;
a partition provided within the opening portion to prevent fuel gas within the housing from entering the recess; and
a vehicle side communication device provided within the recess and on an outer circumferential side of the receptacle, the vehicle side communication device being configured to wirelessly communicate with a nozzle side communication device provided to the nozzle,
wherein the partition wall seals the opening portion to prevent the fuel gas from entering the recess through the opening portion and directly contacting the vehicle side communication device.

10. The fuel cell vehicle according to claim 9,
wherein the bottom wall of the housing has a hole portion, and
wherein the receptacle extends through the hole portion to protrude from the bottom face of the bottom wall to the inner space of the housing.

11. The fuel cell vehicle according to claim 1,
wherein the bottom wall of the housing has a hole portion, and
wherein the receptacle extends through the hole portion to protrude from the bottom face of the bottom wall to the inner space of the housing.

* * * * *